United States Patent [19]

Peters

[11] Patent Number: 4,961,963

[45] Date of Patent: Oct. 9, 1990

[54] SILICONE RELEASE COATINGS CONTAINING RHODIUM

[75] Inventor: Yolanda A. Peters, Midland County, Mich.

[73] Assignee: Dow Corning Corporation, Midland, Mich.

[21] Appl. No.: 402,392

[22] Filed: Sep. 1, 1989

[51] Int. Cl.$^5$ .............................................. B05D 5/10
[52] U.S. Cl. .................... 427/208.8; 427/387; 427/407.1; 525/478; 528/15; 528/31; 528/32
[58] Field of Search ................. 427/208.8, 387, 407.1; 528/15, 31, 32; 525/478

[56] References Cited

U.S. PATENT DOCUMENTS

| | | | |
|---|---|---|---|
| 3,890,359 | 6/1975 | Chandra | 260/429 |
| 3,928,629 | 12/1975 | Chandra et al. | 427/387 |
| 3,960,810 | 6/1976 | Chandra et al. | 260/46.5 |
| 4,123,604 | 10/1978 | Sandford | 528/31 |
| 4,262,107 | 4/1981 | Eckberg | 528/15 |
| 4,472,563 | 9/1984 | Chandra et al. | 528/15 |
| 4,609,574 | 9/1986 | Keryk et al. | 427/407.1 |

FOREIGN PATENT DOCUMENTS 2065152A 6/1981 United Kingdom .

*Primary Examiner*—Michael Lusignan
*Attorney, Agent, or Firm*—George A. Grindahl

[57] ABSTRACT

A process for preparing a release liner for pressure-sensitive adhesives makes use of an organic-solvent solution of a rhodium-curable organopolysiloxane composition. The composition contains a high-viscosity, alkenyl-containing organopolysiloxane gum and an organohydropolysiloxane. The liner is particularly useful for releasing acrylic adhesives which have been applied in-line thereto.

10 Claims, No Drawings

SILICONE RELEASE COATINGS CONTAINING RHODIUM

BACKGROUND OF THE INVENTION

This invention relates to an improved composition and process for treating substrates to aid in the release of adhesive materials therefrom. Specifically, this invention relates to silicone compositions which cure by the rhodium-catalyzed reaction of Si—H groups with Si—olefin groups so that subsequent interaction with adhesives, particularly acrylic adhesives, applied thereto, particularly in-line, is minimized.

The application of curable silicone compositions to substrates such as paper to aid in the release of adhesive materials therefrom is old and well known in the coatings art. For example, the preparation of laminates consisting of a release paper and a sheet material which may be a decorative lamina or a label material coated with a pressure sensitive adhesive is well known. When it is desired to use the coated sheet material and finally affix it, the release paper is peeled off and discarded.

In the preparation of laminates of release paper and an adhesive film, one of two processes is normally used. In one process, the off-line process, the silicone composition is coated on paper and cured; then, at a later time, an adhesive film is applied to the cured silicone coating. In the other process, the in-line process, the silicone composition is applied to paper and cured and the adhesive is then immediately coated on the cured silicone coating. While the in-line process is generally more efficient and would normally be more advantageous, it has been found that some adhesives bond, i.e. weld, to platinum-containing, silicone-coated paper if the adhesive is applied to the silicone-coated paper within a short time after the silicone composition has been cured. It is believed that residual SiH functionality, in the presence of the platinum-containing curing catalyst, is responsible for the welding of the silicone and adhesive in the in-line process. The release problem is not usually observed with the off-line process, apparently because the off-line storage period allows for continued reaction and depletion of the reactive functionality of a platinum-containing silicone composition. Furthermore, the release problem is not usually observed with the in-line or off-line process when the silicone release coating has been cured with a rhodium-containing catalyst, apparently because any residual SiH is not reactive with the adhesive at room temperature when a rhodium-containing catalyst is used.

There has been interest in applying silicone release coatings to more economical substrates, such as polyethylene film and low-grade paper. Consequently there is a need for silicone adhesive release coatings which wet-out, i.e. uniformly coat, on polymeric substrates while at the same time hold-out, i.e. have little or no penetration, on coarse paper.

The silicone compositions, noted above, which are curable by the rhodium-catalyzed reaction of SiH-functional siloxane polymers with vinyl-functional siloxane polymers are well known. See U.S. Pat. No. 4,123,604 to Sandford; U.S. Pat. No. 4,262,107 to Eckberg; and U.S. Pat. Nos. 3,928,629 and 3,960,810 to Chandra and Rowland. However, these compositions are solventless compositions which do not comprise highly viscous organopolysiloxanes and likely will not meet the wet-out and hold-out requirements of the more economical substrates noted above.

SUMMARY OF THE INVENTION

It is an object of this invention to provide an improved curable silicone coating composition that can be used in the in-line process for making laminates without the problem of bonding or welding between the silicone coating and the adhesive. It is a further object to provide a curable silicone coating composition that can be used with alternative substrates such as polymeric film and low-grade paper.

These objects, and others which will become apparent upon consideration of the following specification and appended claims, are obtained by the composition and method of this invention which, briefly stated, comprises coating a substrate with a composition comprising an organic-solvent solution of a high-viscosity organopolysiloxane containing olefinic radicals, an organohydrogenpolysiloxane and a rhodium-containing catalyst, curing the applied composition to the subsrtate, and bringing an adhesive into releaseable contact with the cured composition. In a preferred embodiment the present invention further comprises applying an acrylic pressure-sensitive adhesive to the cured coating composition of this invention, in-line, to provide a releaseable laminate.

DETAILED DESCRIPTION OF THE INVENTION

The present invention relates, in one aspect, to a curable silicone release composition consisting essentially of (A) a polydihydrocarbylsiloxane having a Williams Plasticity Number of at least 115 and containing at least two silicon-bonded alkenyl radicals, at least 90 percent of all hydrocarbyl radicals being methyl, (B) a catalytic amount of a rhodium-containing hydrosilylation catalyst, (C) a methylhydrogenpolysiloxane cross-linking agent having an average of at least three silicon-bonded hydrogen atoms per molecule with the hydrogen atoms being bonded to separate silicon atoms, in an amount sufficient to provide from 0.5 to 1.5 silicon-bonded hydrogen atom for every alkenyl radical in the composition, and (D) a solvent in sufficient amount to provide a viscosity at 25° C. of less than 2 Pa·s for the composition.

Polydihydrocarbylsiloxane (A) has a Williams Plasticity Number of at least 115, as measured according to ASTM 926-67, incorporated herein by reference to teach how to measure the Plasticity Number of a material. Polydimethylsiloxanes having such a Plasticity Number typically have a viscosity of at least 5,000 Pa·s (5 million centipoise) at 25° C. and an average molecular weight of about 200,000.

Polydihydrocarbylsiloxane (A) contains at least two silicon-bonded alkenyl radicals, such as vinyl, allyl, cyclohexenylethyl and hexenyl, and at least 90 percent of all hydrocarbyl radicals are methyl. Hydrocarbyl radicals, other than methyl radicals and alkenyl radicals, that may be present in polydihydrocarbylsiloxane (A) include other alkyl radical, such as ethyl, propyl, butyl and hexyl; cycloaliphatic radicals, such as cyclohexyl; and aromatic radicals such as phenyl, benzyl, tolyl and phenylethyl.

Polydihydrocarbylsiloxane (A) preferably contains dihydrocarbylsiloxane units of the formula $R_2SiO_{2/2}$ and chain-terminating trihydrocarbylsiloxane units of the formula $R_3SiO_{\frac{1}{2}}$ wherein R denotes a hydrocarbyl radical, at least 90% of which are methyl and at least two of which are alkenyl radicals containing terminal unsaturation.

It is preferred that polydihydrocarbylsiloxane (A) consist essentially of units selected from the group consisting of dimethylsiloxane units, trimethylsiloxane units, alkenylmethylsiloxane units, and alkenyldimethylsiloxane units. Examples of siloxane units which form the polydihydrocarbylsiloxane (A) include trimethylsiloxane units, dimethylsiloxane units, dimethylvinylsiloxane units and methylvinylsiloxane units and preferably providing a dimethylvinylsiloxane-endblocked polydimethylsiloxane-co-methylvinylsiloxane.

The preparation of polydihydrocarbylsiloxane (A) is well known in the organosilicone literature and needs no detailed delineation herein. Typically, alkenyl-substituted siloxanes are equilibrated with cyclopolydimethylsiloxanes using an alkaline catalyst such as KOH. It should be noted that linear siloxanes produced by equilibration procedures may contain small amounts, such as 0 to 15 weight percent, of cyclopolydihydrocarbylsiloxanes which may be volatile at temperatures up to 150° C. For the purposes of this invention either siloxanes that still contain the small amounts of cyclics, or siloxanes from which the co-produced cyclics have been removed by volatilization may be used.

While polydihydrocarbylsiloxane (A) is linear and is to bear only hydrocarbon radicals on silicon, it is within the scope and spirit of this invention to permit the presence therein of trace amounts of non-linear siloxane units i.e. $SiO_{4/2}$, and $RSiO_{3/2}$, wherein R is as described above, and trace amounts of other silicon-bonded radicals, such as hydroxyl and alkoxyl, which are incidentally present in polydihydrocarbylsiloxanes. Preferably, the polydihydrocarbylsiloxanes are free of the non-linear siloxane units and incidental radicals, although hydroxyl-endblocked polydihydrocarbylsiloxanes are contemplated as a suitable component (A) in the compositions of this invention.

Component (B) is any rhodium-containing hydrosilylation catalyst that is effective to catalyze the addition reaction of silicon-bonded hydrogen atoms with silicon-bonded vinyl radicals in the well-known manner. Typically, component (B) is a rhodium-containing compound, such as a complex of rhodium halides. Preferably the rhodium-containing catalyst is soluble in the curable silicone release composition.

Rhodium-containing hydrosilylation catalysts are well known in the organosilicon art and need no further delineation herein. For further details, if needed, the reader is directed to the teachings of, for example, Chandra, U.S. Pat. No. 3,890,359.

Although not required the coating compositions of the present invention can contain an effective amount of an inhibitor for the rhodium-containing catalyst. In the well-known manner, preferred inhibitors reduce the activity of the metal catalyst at room temperature thus increasing the time period during which the composition may be used at room temperature while still allowing fast cure at elevated temperatures. Examples of suitable inhibitors include pyridine, acrylonitrile, 2-ethenylisopropanol, perchloroethylene, acetylenic alcohol, organic phosphines and phosphites, benzotriazole, organic sulfoxides, metallic salts aminofunctional siloxanes, ethylenically-unsaturated isocyanurates, alkenyl siloxanes, dialkyl carboxylic esters, ene-ynes and unsaturated amides.

Methylhydrogenpolysiloxane (C) operates as a curing agent for the polydihydrocarbylsiloxane (A) in the coating composition and must contain an average of at least three, preferably more than three, silicon-bonded hydrogen atoms per molecule. By the name, methylhydrogenpolysiloxane, it is meant that at least three, but preferably all, silicon atoms therein which bear the hydrogen atoms also bear at least one methyl radical. For efficient curing of the composition, it is preferred that no silicon atom bear more than one silicon-bonded hydrogen atom.

Preferred siloxane units which form the methylhydrogenpolysiloxane include, where Me denotes the methyl radical $Me_3SiO_{\frac{1}{2}}$, $Me_2HSiO_{\frac{1}{2}}$, $Me_2SiO_{2/2}$, $MeHSiO_{2/2}$, $MeSiO_{3/2}$, $SiO_{4/2}$ and $HSiO_{3/2}$. Examples of methylhydrogenpolysiloxanes which are operative in the process of this invention include, but are not limited to, siloxanes consisting of $Me_3SiO_{\frac{1}{2}}$ units and $MeHSiO_{2/2}$ units, siloxanes consisting of $Me_3SiO_{\frac{1}{2}}$ units, $Me_2SiO_{2/2}$ units and $MeHSiO_{2/2}$ units, siloxanes consisting of $HMe_2SiO_{\frac{1}{2}}$ units, $Me_2SiO_{2/2}$ units and $MeHSiO_{2/2}$ units, siloxanes consisting of $SiO_{4/2}$ units, $Me_3SiO_{\frac{1}{2}}$ units and $HMe_2SiO_{\frac{1}{2}}$ units, siloxanes consisting of $SiO_{4/2}$ units and $HMe_2SiO_{\frac{1}{2}}$ units, siloxanes consisting of $HMeSiO_{2/2}$ units and siloxanes consisting of $HMeSiO_{2/2}$ units and $Me_2SiO$ units.

Specific examples of methylhydrogenpolysiloxanes that may be used in the compositions of this invention include $(HMe_2SiO)_4Si$, $(MeHSiO)_4$, $MeSi(OSiMe_2H)_3$, and, preferably, higher molecular weight trimethyl-endblocked polydimethylsiloxane-co-methylhydrogensiloxanes having, for example, the average formulae $Me_3SiO(Me_2SiO)_3(MeHSiO)_5SiMe_3$, $Me_3SiO(Me_2SiO)_{12}(MeHSiO)_{28}SiMe_3$, $Me_3SiO(MeHSiO)_{35}SiMe_3$, and $Me_3SiO(Me_2SiO)_6(MeHSiO)_{10}SiMe_3$. The higher molecular weight methylhydrogenpolysiloxanes are preferred as curing component for silicone release compositions because they have a low volatility and will remain with and more effectively cure silicone release compositions at elevated temperatures.

Methylhydrogenpolysiloxanes are well known in the organosilicon polymer art; their preparation therefore needs no further elaboration here. As in the case of the preparation of polydihydrocarbylsiloxanes, it should be noted that the preparation of methylhydrogenpolysiloxanes comprising dimethylsiloxane units may co-provide small amounts of cyclopolydimethylsiloxanes. The presence or absence of these cyclopolydimethylsiloxane species in the methylhydrogenpolysiloxane is of no importance to this invention as long as the methylhydrogenpolysiloxane has an average of at least 3 silicon-bonded hydrogens per molecule.

The coating compositions of this invention further comprise a sufficient amount of a solvent (D) to provide a viscosity at 25° C. of less than 2 Pa·s (2,000 centipoise) for the composition. The solvent typically should have a normal boiling point of less than 150° C. in order to facilitate its removal by evaporation form the composition after it has been applied to a substrate. Examples of suitable solvents include aliphatic hydrocarbons such as pentane, hexane and heptane; aromatic hydrocarbons, such as benzene, toluene and xylene; halogenated hydrocarbons and mineral spirits.

For efficient curing, polydihydrocarbylsiloxane (A) and methylhydrogenpolysiloxane (C) are mixed in the coating compositions in amounts that will provide a composition containing 0.5 to 1.5 silicon-bonded hydrogen atoms for every alkenyl radical in the composition.

Compositions containing 0.9 to 1.1 silicon-bonded hydrogen atom for every unsaturated radical in the composition, are more preferred in order to minimize residual reactive functionality after curing so that subsequent interaction with applied adhesive is prevented.

The amount of rhodium-containing catalyst (B) to be used in the curable coating compositions is merely that amount that will catalyze the addition of silicon-bonded hydrogen to silicon-bonded alkenyl and provide the desired cure time at a particular curing temperature. A suitable catalytic amount of rhodium-containing catalyst can be determined by simple experimentation. Rhodium-containing catalysts are typically employed in amounts sufficient to provide 50 to 500 parts by weight of rhodium for every 1 million parts by weight of (A) plus (C).

The curable coating composition may further contain additional components, such as controlled release additives, pigments, rheology control additives, substrate-adhesion promoters, and adjuvants to further control substrate-penetration by the coating composition which do not adversely interfere with the curing of the composition or its use as a release agent.

More particularly, it should be noted that the use of controlled release additives such as the toluene soluble siloxane resins which are described as copolymers of (a) $(CH_3)_3SiO_{\frac{1}{2}}$ units, (b) alkenyldimethylsiloxane units, and (c) $SiO_{4/2}$ units, the ratio of the (a)+(b) units to (c) units being from 0.6:1 to 1.1:1 and the silicon-bonded hydroxy content of the copolymer being no more than 0.7 weight percent, is contemplated within the scope of the present invention. When used, the release additives are typically employed in amounts of 5 to 45 percent by weight of the coating composition.

Coating compositions are prepared by mixing the desired amounts of the above-described components and any additional components in any suitable manner such as by stirring, blending and/or tumbling and in any suitable order. Preferably the methylhydrogenpolysiloxane and the rhodium-containing catalyst are brought together in a final mixing step. Typically, curable coating compositions can be conveniently prepared by combining two non-curing compositions which, when mixed in proper proportions, will give rise to the curable coating composition.

In another aspect the present invention relates to a process for preparing a laminate comprising a substrate and an adhesive releaseably adhered thereto, said process comprising the steps of: (I) coating a curable silicone release composition on the surface of the substrate; (II) heating the coated silicone release composition until it is cured to the substrate; and (III) applying an adhesive to the silicone coating cured to the substrate; wherein the curable silicone release composition consists essentially of (A) a polydihydrocarbylsiloxane having a Williams Plasticity Number of at least 115 and containing at least two silicon-bonded alkenyl radicals, at least 90 percent of all hydrocarbyl radicals being methyl, (B) a catalytic amount of a rhodium-containing hydrosilylation catalyst, (C) a methylhydrogenpolysiloxane crosslinking agent having an average of at least three silicon-bonded hydrogen atoms per molecule with the hydrogen atoms being bonded to separate silicon atoms, in an amount sufficient to provide from 0.5 to 1.5 silicon-bonded hydrogen atom for every alkenyl radical in the composition, and (D) a solvent in sufficient amount to provide a viscosity at 25° C. of less than 2 Pa·s for the composition.

The compositions that are used in the process of this invention are the compositions, including preferred embodiments thereof, delineated above.

Any solid substrate may be treated by the compositions of this invention to provide release of adhesive materials therefrom. Examples of suitable substrates include cellulosic materials, such as paper, cardboard, and wood; metals, such as aluminum, iron, and steel; siliceous materials, such as ceramics, glass, and concrete; and synthetics, such as polyester, polyepoxide, and polyethylene. To assure proper curing and adhesion of the silicone coating, the substrate should be clean and free of materials which undesirably inhibit the cure of the release composition, such as materials containing amines, mercaptans and phosphines.

The process of this invention is particularly useful for preparing a laminate of a substrate and an adhesive wherein the adhesive will release from the substrate said process comprising applying, in-line, an adhesive to the silicone surface of the substrate.

In the process for preparing a laminate, the curable silicone composition of this invention may be coated on the surface of the substrate by any of the well-known methods for coating flexible substrates such as brushing, dipping, spraying, trailing blade coater, knife over roll, reverse roll, and gravure. Any suitable amount of coating material may be applied to the substrate. Generally, a thin coating of the silicone release composition is employed so as to provide approximately 0.1 to 2.0 grams of solvent-free composition per square meter of coated surface with about one gram per square meter of coated surface being preferred.

Curing of the silicone coating composition can be initiated in any convenient way such as by infrared lamps, by radiation, or by forced air oven which is often most suitable. Curing can be accomplished at any convenient temperature, but typically it is most advantageous to use temperatures above room temperature such as 50° C. to 150° C. with temperatures of 70° C. to 120° C. being preferred and temperatures of 70° C. to 90° C. being most preferred to provide rapid cure while conserving heat energy.

In the process of this invention, the adhesive is applied, preferably in-line, to the cured silicone surface of the substrate. By in-line, it is meant that the adhesive is applied to the silicone coated surface of the substrate within a short time after the curing of the silicone, and without reeling and storing the silicone coated substrate prior to the adhesive application step. Typically, the adhesive will be applied less than one hour after the silicone is cured and usually less than 5 minutes after the silicone is cured.

The adhesive may be applied by any of the well-known methods such as by coating hot melt adhesives or solutions of adhesive resins in solvent, or by pressing an adhesive film supported on a sheet material to the silicone coated surface.

The type of adhesive material used in the process of this invention is not critical and any of the well-known materials can be used. The process of the present invention is especially useful when employed with acrylic adhesives since these adhesives, when applied in line, bond or weld to the SiH-vinyl cured silicone coatings of the prior art. Acrylic adhesives contain polyacrylate elastomers and are well known for use in decals, tapes, and many other general purpose adhesive laminates.

The following examples are presented to illustrate the invention to those skilled in the art and should not be construed as limiting the invention, which is properly delineated in the appended claims. All proportions by parts or percents are by weight unless otherwise stated.

Cure time for a composition means the time interval required for the composition, when coated onto S2S kraft paper, at the thickness of 1 pound per ream, to attain the no smear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

Adhesive release test samples were prepared using a fully cured coating as follows. The cured coating was coated with adhesive using Monsanto (St. Louis, MO.) GMS-263 acrylic adhesive (hereinafter acrylic adhesive). The adhesive solution was applied to the coating at a wet thickness of 3 mils using a drawdown bar. The applied adhesive was airdried at room temperature for one minute, heated at 70 degrees C. for one minute and the cooled to room temperature for one minute. A sheet of 60 pound matte litho was applied to the dried adhesive and the resulting laminate was pressed with a 4.5 pound rubber-coated roller. The test laminate was then aged at room temperature and at 70 degrees C. and cut into 1×6 inch strips. The laminate was pulled apart at a rate of 12 inches/minute using a Keil Tester. The values recorded are the average of 4 readings taken during the course of one pull per sample. The Keil Tester is described in TAPPI, vol. 43, No. 8 pages 164A and 165A (August 1960).

EXAMPLE 1

A composition of this invention was prepared by mixing to homogeneity 300 parts of a dimethylvinylsiloxane-endblocked polydimethylsiloxane-co-methylvinylsiloxane having a Williams Plasticity Number of 140 and a vinyl content of 0.8%, 696 parts of toluene, 0.2 parts of a rhodium-containing catalyst having the formula $RhCl_3\{S(CH_2CH_2CH_2CH_3)_2\}_3$, and 3.2 parts of polymethylvinylcyclosiloxane as catalyst inhibitor having the formula $(MeViSiO)4-6$. A composition of this invention was prepared by mixing 200 parts of the above-prepared composition, 799 parts of heptane and 1.0 parts of a trimethylsiloxane-endblocked polymethylhydrogensiloxane fluid having a viscosity of about 5 mPa·s at 25° C. and an available hydrogen content of about 1.67%. For comparison an identical composition was prepared, except containing a vinylsiloxane-complexed platinum compound instead of the rhodium compound.

The resulting curable compositions were applied to supercalendered kraft paper with a #12 Mayer rod and heated at 250° F. for 10 seconds in a forced air oven. Ten minutes later the cured silicone coatings were coated with GMS-263 acrylic adhesive and evaluated for release force, as noted above. The laminate prepared by the method of this invention gave a considerably lower release value than the laminate prepared from the comparison composition.

EXAMPLE 2

A composition of this invention was prepared by mixing to homogeneity 300 parts of a dimethylvinylsiloxane-endblocked polydimethylsiloxane-co-methylvinylsiloxane having a Williams Plasticity Number of 140 and a vinyl content of 0.8%, 696 parts of toluene, 0.2 parts of a rhodium-containing catalyst having the formula $RhCl_3\{S(CH_2CH_2CH_2CH_3)_2\}_3$, and 3.2 parts of polymethylvinylcyclosiloxane as catalyst inhibitor having the formula $(MeViSiO)4-6$. A composition of this invention was prepared by mixing 100 parts of the above-prepared composition, 400 parts of hexane, 0.5 parts of a trimethylsiloxane-endblocked polymethylhydrogensiloxane fluid having a viscosity of about 5 mPa·s at 25° C. and an available hydrogen content of about 1.67%. For comparison an identical composition was prepared, except containing a vinylsiloxane-complexed platinum compound instead of the rhodium compound and 0.2 parts of ethynylcyclohexene.

The resulting curable compositions were applied to supercalendered kraft paper with a #12 Mayer rod and heated at 250° F. or 350° F. for 10, 30 or 50 seconds in a forced air oven. The cured silicone coatings were coated with GMS-263 acrylic adhesive immediately, or after being aged at room temperature for 1 day or 7 days, and identically evaluated for release force. The results, listed in Table I, show the benefit of the method of this invention wherein a liner is cured at low temperature, or at high temperature for a brief period of time, and immediately contacted with an acrylic adhesive. That benefit even exists, albeit to a lesser degree, if the liner is brought into contact with the adhesive after 7 days.

TABLE I

| Process | Cure | | Release, g/in. | | |
|---|---|---|---|---|---|
| | | | Immediate | 1 Day | 7 Days |
| This Invention | 230° F. | 10 sec. | Tear | 140 | 40 |
| | | 30 sec. | 110 | 70 | 35 |
| | | 50 sec. | 60 | 50 | 35 |
| Comparison | 230° F. | 10 sec. | 450 | 160 | 95 |
| | | 30 sec. | 225 | 150 | 65 |
| | | 50 sec. | 200 | 140 | 60 |
| This invention | 350° F. | 10 sec. | 45 | 75 | 35 |
| | | 30 sec. | 45 | 50 | 35 |
| | | 50 sec. | 45 | 60 | 40 |
| Comparison | 350° F. | 10 sec. | 110 | 85 | 55 |
| | | 30 sec. | 40 | 40 | 33 |
| | | 50 sec. | 30 | 35 | 30 |

That which is claimed is:

1. A process for preparing a laminate comprising a substrate and an adhesive releaseably adhered thereto, said process comprising the steps of:
   (I) coating a curable silicone release composition on the surface of the substrate;
   (II) heating the coated silicone release composition until it is cured to the substrate; and
   (III) applying an adhesive to the silicone coating cured to the substrate; wherein the curable silicone release composition consists essentially of
   (A) a polydihydrocarbylsiloxane having a Williams Plasticity Number of at least 115 and containing at least two silicon-bonded alkenyl radicals, at least 90 percent of all hydrocarbyl radicals being methyl, (B) a catalytic amount of a rhodium-containing hydrosilylation catalyst, (C) a methylhydrogenpolysiloxane crosslinking agent having an average of at least three silicon-bonded hydrogen atoms per molecule with the hydrogen atoms being bonded to separate silicon atoms, in an amount sufficient to provide from 0.5 to 1.5 silicon-bonded hydrogen atom for every alkenyl radical in the composition, and (D) a solvent in sufficient amount to provide a viscosity at 25° C. of less than 2 Pa·s for the composition.

2. A process in accordance with claim 1 wherein (A) is a dimethylvinylsiloxane-endblocked polydimethylsiloxane-comethylvinylsiloxane.

3. A process in accordance with claim 1 wherein (B) is a rhodium complex catalyst, present in an amount of from 50–500 parts by weight of rhodium for every 1 million parts by weight of (A) plus (C).

4. A process in accordance with claim 1 wherein (C) is e trimethyl-endblocked polydimethylsiloxane-comethylhydrogensiloxane.

5. A process in accordance with claim 1 wherein the adhesive is an acrylic adhesive.

6. A process in accordance with claim 5 wherein the acrylic adhesive is applied, in line, to the silicone coating cured to the substrate.

7. A curable silicone release composition consisting essentially of (A) a polydihydrocarbylsiloxane having a Williams Plasticity Number of at least 115 and containing at least two silicon-bonded alkenyl radicals, at least 90 percent of all hydrocarbyl radicals being methyl, (B) a catalytic amount of a rhodium-containing hydrosilylation catalyst, (C) a methylhydrogenpolysiloxane crosslinking agent having an average of at least three silicon-bonded hydrogen atoms per molecule with the hydrogen atoms being bonded to separate silicon atoms, in an amount sufficient to provide from 0.5 to 1.5 silicon-bonded hydrogen atom for every alkenyl radical in the composition, and (D) a solvent in sufficient amount to provide a viscosity at 25° C. of less than 2 Pa·s for the composition.

8. A composition in accordance with claim 7 wherein (A) is a dimethylvinylsiloxane-endblocked polydimethylsiloxaneco-methylvinylsiloxane.

9. A composition in accordance with claim 7 wherein (B) is a rhodium complex catalyst, present in an amount of from 50–500 parts by weight of rhodium for every 1 million parts by weight of (A) plus (C).

10. A composition in accordance with claim 7 wherein (C) is a trimethyl-endblocked polydimethylsiloxane-comethylhydrogensiloxane.

* * * * *